United States Patent [19]
Smith, III.

[11] Patent Number: 6,123,103
[45] Date of Patent: Sep. 26, 2000

[54] PRESSURE BALANCED COUPLING WITH SPLIT BODY

[75] Inventor: Robert E. Smith, III., Missouri City, Tex.

[73] Assignee: National Coupling Company, Inc., Stafford, Tex.

[21] Appl. No.: 09/364,000

[22] Filed: Jul. 29, 1999

[51] Int. Cl.$^7$ ....................................................... F16L 37/28
[52] U.S. Cl. ................................. 137/614.04; 251/149.7; 285/106; 285/900
[58] Field of Search ............................... 137/614.04, 614; 251/282, 149.7, 367; 285/106, 900

[56] References Cited

U.S. PATENT DOCUMENTS

| | | |
|---|---|---|
| 1,237,309 | 8/1917 | Dewald . |
| 1,736,922 | 11/1929 | Kohlen . |
| 1,872,498 | 8/1932 | Rasmussen et al. . |
| 1,913,982 | 6/1933 | Fox . |
| 1,928,821 | 10/1933 | Santiago . |
| 2,218,318 | 10/1940 | Pfauser . |
| 2,265,267 | 12/1941 | Cowles . |
| 2,598,009 | 5/1952 | Peeps . |
| 2,703,719 | 3/1955 | Crothers . |
| 2,729,241 | 1/1956 | Clark . |
| 2,730,380 | 1/1956 | Espy et al. . |
| 2,735,696 | 2/1956 | Omon et al. . |
| 2,825,590 | 3/1958 | Sutherland . |
| 2,854,258 | 9/1958 | Hickey et al. . |
| 3,013,826 | 12/1961 | Sharp . |
| 3,046,026 | 7/1962 | Burrows . |
| 3,049,148 | 8/1962 | Richardson . |
| 3,089,713 | 5/1963 | Scaramucci . |
| 3,111,179 | 11/1963 | Albers et al. . |
| 3,147,015 | 9/1964 | Hanback . |
| 3,163,431 | 12/1964 | Tanner . |
| 3,215,161 | 11/1965 | Goodwin et al. .................. 137/614.04 |
| 3,236,251 | 2/1966 | Hansen . |
| 3,288,472 | 11/1966 | Watkins . |
| 3,291,152 | 12/1966 | Comer ................................. 137/614.04 |
| 3,331,609 | 7/1967 | Moran . |

(List continued on next page.)

FOREIGN PATENT DOCUMENTS

| | | |
|---|---|---|
| 0024986 | 3/1981 | European Pat. Off. . |
| 0177650 | 4/1985 | European Pat. Off. . |
| 663132 | 3/1929 | France . |
| 1142462 | 4/1957 | France . |
| 1272472 | 10/1961 | France . |
| 1491524 | 7/1967 | France . |
| 647885 | 7/1937 | Germany . |
| 343726 | 2/1960 | Switzerland . |
| 552435 | 4/1943 | United Kingdom . |
| 552862 | 4/1943 | United Kingdom . |
| 677685 | 8/1952 | United Kingdom . |
| 819421 | 8/1959 | United Kingdom . |
| 836002 | 6/1960 | United Kingdom . |
| 886133 | 1/1962 | United Kingdom . |
| 888143 | 1/1962 | United Kingdom . |
| 925491 | 5/1963 | United Kingdom . |
| 2225314 | 12/1972 | United Kingdom . |
| 1325023 | 8/1973 | United Kingdom . |
| 1564906 | 11/1976 | United Kingdom . |
| 1567373 | 3/1977 | United Kingdom . |
| 1548852 | 7/1979 | United Kingdom . |
| 1588739 | 4/1981 | United Kingdom . |
| 1603670 | 11/1981 | United Kingdom . |
| 2184168 | 6/1987 | United Kingdom . |

*Primary Examiner*—Kevin Lee
*Attorney, Agent, or Firm*—Fulbright & Jaworski

[57] ABSTRACT

A pressure balanced hydraulic coupling for use in undersea drilling and production operations is shown. The coupling has radial passages connecting between the male and female members such that fluid pressure is not exerted against the face of either member during coupling or uncoupling. The female member has a split body with a first part and a second part, each having a longitudinal passage and a radial fluid passage. A radial seal is positioned on the junction between the first and second parts of the female member body to facilitate removal and replacement of the radial seal when the split body is disassembled. The male member may be inserted through the first and second parts of the female coupling member, thereby establishing fluid communication between the coupling members in a direction transverse to the coupling member bores.

20 Claims, 3 Drawing Sheets

U.S. PATENT DOCUMENTS

| | | |
|---|---|---|
| 3,348,575 | 10/1967 | Simak . |
| 3,374,985 | 3/1968 | Gessic . |
| 3,378,269 | 4/1968 | Castor . |
| 3,507,523 | 4/1970 | Cadley . |
| 3,516,524 | 6/1970 | Kelty et al. . |
| 3,550,624 | 12/1970 | Johnson ................................. 137/614 |
| 3,618,690 | 11/1971 | Johnson . |
| 3,707,878 | 1/1973 | Treichler . |
| 3,777,771 | 12/1973 | De Visscher . |
| 3,797,510 | 3/1974 | Torres et al. . |
| 4,036,467 | 7/1977 | Dalton . |
| 4,074,702 | 2/1978 | Lewis . |
| 4,124,228 | 11/1978 | Morrison . |
| 4,169,604 | 10/1979 | Heathcott . |
| 4,177,998 | 12/1979 | Laitkep et al. . |
| 4,188,038 | 2/1980 | Goedicke . |
| 4,222,411 | 9/1980 | Herzan et al. ................... 137/614.04 |
| 4,272,108 | 6/1981 | Maasberg ........................ 285/900 X |
| 4,348,039 | 9/1982 | Miller . |
| 4,452,462 | 6/1984 | Karr, Jr. . |
| 4,455,040 | 6/1984 | Shinn . |
| 4,475,712 | 10/1984 | DeJager . |
| 4,582,295 | 4/1986 | Kugler et al. ....................... 251/149.6 |
| 4,632,406 | 12/1986 | Akkerman . |
| 4,635,945 | 1/1987 | Beck . |
| 4,637,470 | 1/1987 | Weathers et al. . |
| 4,641,841 | 2/1987 | Regan . |
| 4,694,859 | 9/1987 | Smith, III ........................ 137/614.04 |
| 4,703,774 | 11/1987 | Seehausen ........................ 137/614.04 |
| 4,709,726 | 12/1987 | Fitzgibbons ....................... 137/614.04 |
| 4,709,727 | 12/1987 | Gober . |
| 4,754,780 | 7/1988 | Smith, III ........................ 137/614.04 |
| 4,768,538 | 9/1988 | Mintz et al. . |
| 4,813,454 | 3/1989 | Smith, III ........................ 137/614.04 |
| 4,815,770 | 3/1989 | Hyne et al. . |
| 4,817,668 | 4/1989 | Smith, III ........................ 137/614.04 |
| 4,832,080 | 5/1989 | Smith, III ........................ 137/614.04 |
| 4,834,139 | 5/1989 | Fitzgibbons ....................... 137/614.04 |
| 4,854,615 | 8/1989 | Smith, III . |
| 4,858,648 | 8/1989 | Smith, III ........................ 137/614.04 |
| 4,884,584 | 12/1989 | Smith ................................ 137/614.04 |
| 4,900,071 | 2/1990 | Smith, III . |
| 5,015,016 | 5/1991 | Smith, III ............................... 285/108 |
| 5,029,613 | 7/1991 | Smith, III ........................ 137/614.04 |
| 5,052,493 | 10/1991 | Smith, III ........................ 137/614.04 |
| 5,099,882 | 3/1992 | Smith, III ........................ 137/614.04 |
| 5,203,374 | 4/1993 | Smith, III ........................ 137/614.04 |
| 5,232,021 | 8/1993 | Smith ................................ 137/614.04 |
| 5,277,225 | 1/1994 | Smith ................................ 137/614.04 |
| 5,360,035 | 11/1994 | Smith ................................ 137/614.04 |
| 5,390,702 | 2/1995 | Smith, III ........................ 137/614.04 |
| 5,469,887 | 11/1995 | Smith, III ........................ 137/614.04 |
| 5,983,934 | 11/1999 | Smith, III ........................ 137/614.04 |

PRESSURE BALANCED COUPLING WITH SPLIT BODY

BACKGROUND OF THE INVENTION

1. Field of the Invention

This invention relates, in general, to hydraulic couplings, and specifically to hydraulic couplings used in undersea drilling and production applications. More particularly, the invention involves a pressure balanced hydraulic coupling wherein radial passages are positioned to allow connection or disconnection of the coupling without substantial fluid pressure exerted axially against the face of the male member. Further, the invention relates to a pressure balanced coupling with a split body to facilitate insertion and removal of one or more radial seals.

2. Description of Related Art

Subsea hydraulic couplings are old in the art. The couplings generally consist of a male and female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use of hydraulic couplings in relatively high pressure systems due to the high axial forces imposed on the male and female members during the coupling operation and during their use. In such couplings, it is necessary for the fluid force opposing the face of the male or female member to be overcome before the fluid communication is established between the members. In a relatively high pressure system, high forces imposed on the valve members may render the connection of the coupling members difficult. Also, during use, fluid pressure is exerted between the male and female members in such a way as to tend to separate them. The force necessary to join the members and the resultant tendency of the coupling members to separate are characteristic problems in the prior art. High pressure systems and undersea applications also experience problems associated with sealing the junction between the male and female members.

Ideally, hydraulic couplings should, as far as possible, be pressure balanced, so that fluid pressure does not hinder connection or urge separation of the members. The coupling members often include valves that open automatically on coupling and close automatically on uncoupling. The coupling also should prevent implosion of seals due to a vacuum when the coupling members are separated. Finally, to prevent loss of fluid in coupling or uncoupling, the coupling should employ seals which can withstand high pressures as well as the corrosive effects of undersea or other adverse environments.

The insertion and removal of radial seals from the bore of the female member also can present difficulties, when one or more seals are retained in the female member. With the use of undersea hydraulic couplings at greater ocean depths, deterioration or buildup of silt and/or other debris can degrade the seal and necessitate its replacement. The present invention is intended to provide an undersea hydraulic coupling that solves all of these needs and requirements.

Undersea hydraulic couplings are disclosed in the prior art. In U.S. Pat. Nos. 4,694,859 and 5,762,106 to Robert E. Smith, III, undersea hydraulic couplings with radial metal seals are shown. The radial metal seal is retained on a shoulder in the female bore. The seal is pressure energized to seal radially with the circumference of the male member and with the female member bore. In U.S. Pat. No. 4,754,780, to Robert E. Smith, III, a pressure balanced hydraulic coupling is shown having radial passages communicating between the male and female members so that hydraulic fluid flow is in a substantially radial direction and is not exerted against the face of either member. U.S. Pat. No. 4,832,080 to Robert E. Smith, III, discloses a pressure balanced hydraulic coupling with metal seals used to seal the annulus between the male and female members when they are coupled. The metal seals may be pressure energized in response to fluid pressure in the coupling to enhance the sealing effect. U.S. Pat. Nos. 4,900,071 and 5,052,439 to Robert E. Smith, III disclose undersea hydraulic couplings with two-piece retainers including a cylindrical retainer sleeve member slidably received within the female member bore, and a threaded retainer locking member threaded to the wall of the central bore. An elastometric seal is restrained from radial movement by a dovetail interfit with a mating shoulder on the retainer sleeve and/or the retainer locking member. U.S. Pat. No. 5,099,882 to Robert E. Smith, III discloses a pressure balanced hydraulic coupling having radial passages in the male and female members, a first pair of radial seals positioned on each side of the radial passages for sealing between the receiving chamber and the seal retainer, and a second pair of radial seals positioned on each side of the radial passage for sealing between the seal retainer and the male member. The seals are pressure energized metal seals. U.S. Pat. No. 5,232,021 to Robert E. Smith, III discloses a probe member for an undersea hydraulic coupling having at least one circumferential depression in its outer cylindrical body, for disengaging one or more radial seals during the insertion or withdrawal of the probe member from the receiving chamber of the female member. U.S. Pat. No. 5,277,255 to Robert E. Smith, III discloses an undersea hydraulic coupling with pressure energized seals. The seals are configured to seal radially between the male and female members of the coupling so that hydraulic fluid does not leak from the annular space between the receiving chamber and outer surface of the male member. U.S. Pat. No. 5,360,035 to Robert E. Smith, III discloses a poppet valve that is pressure balanced for use in an undersea hydraulic coupling. When the poppet valve is open, radial passages are interconnected through an annular cavity between the poppet valve body and the valve bore.

SUMMARY OF THE INVENTION

The present invention resides in a hydraulic coupling of the foregoing type, including male and female members to provide fluid communication therebetween with radial fluid passages mutually positioned to allow connection or disconnection of the coupling members without substantial fluid pressure exerted axially against the face of the male member. The radial fluid passages are mutually positioned so as to substantially prevent separation forces between the male and female members when the passages are pressurized by fluid. The male member of the coupling has a central bore and a radial passage providing fluid communication between the central bore and the outer surface of the male member. The female member of the coupling includes a split body with a first part and a second part removably engaged to the first part. The first part and second part of the split body have a central bore dimensioned to receive the male member therethrough. The first part and second part of the split body each have radial passages extending outwardly from the central bore and longitudinal passages parallel to the central bore. The longitudinal passages in the first and second parts of the split body provide fluid communication between the first part and the second part. A radial seal is positioned on a shoulder surface at the junction between the first part and second part of the split body female member. The seal may be an elastometric seal having a dovetail interfit between the first part and second part, or, alternatively, the seal may be a pressure energized radial metal seal. Additionally, a second radial seal may be positioned on a shoulder in the second part of the split body, and retained on the shoulder with a seal retainer engaged to the second part.

The undersea coupling of the present invention is pressure balanced and facilitates disassembly of the female member split body to remove and replace the radial seals. The present invention provides an improved undersea hydraulic coupling which enhances the ability to remove and replace elastometric or metal seals between the coupling members.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Figure 1:
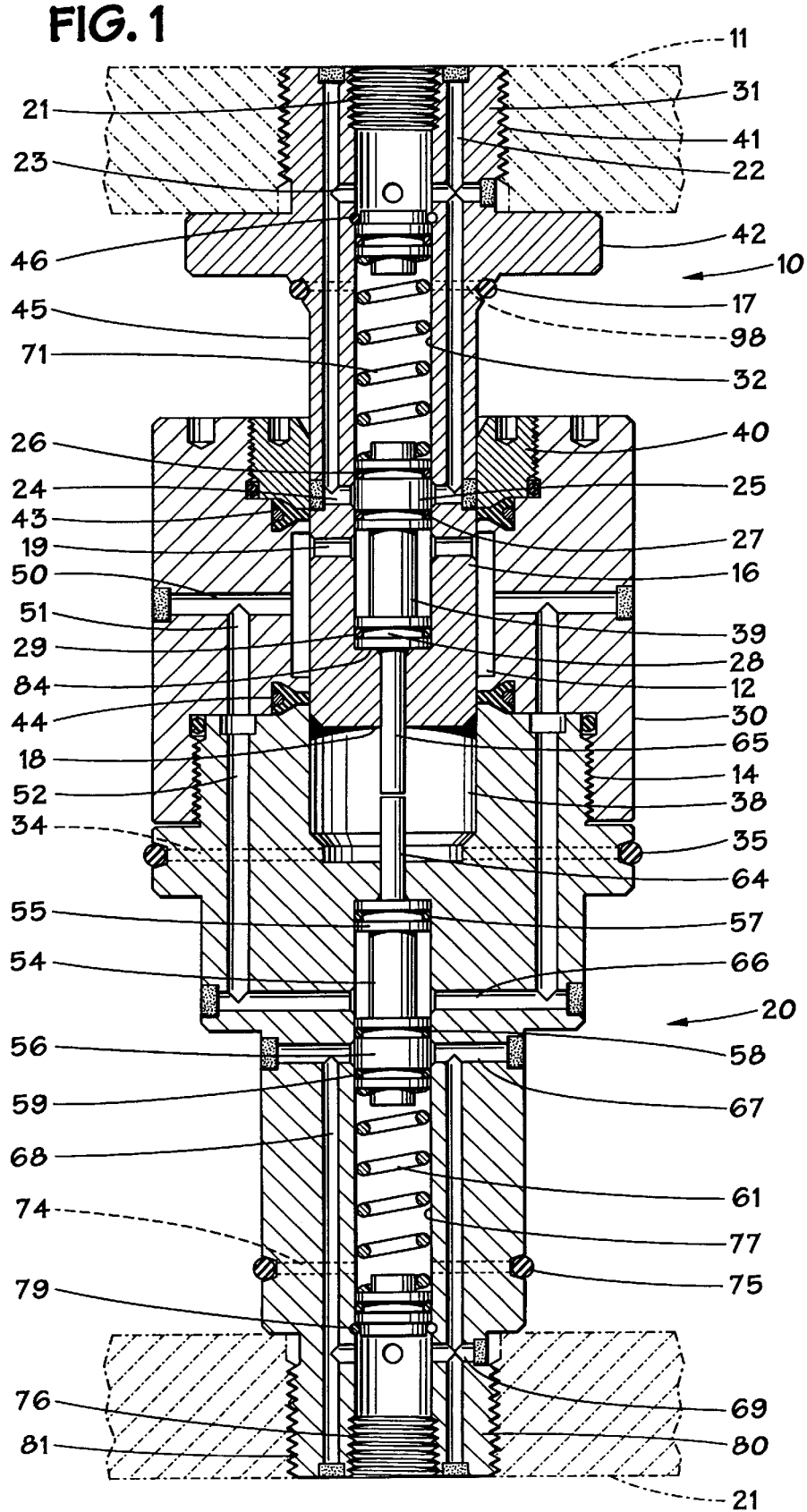
FIG. 1 is a sectional view of the male member and female member of the coupling according to a first embodiment, with the male member partially inserted into the female member.
Figure 2:
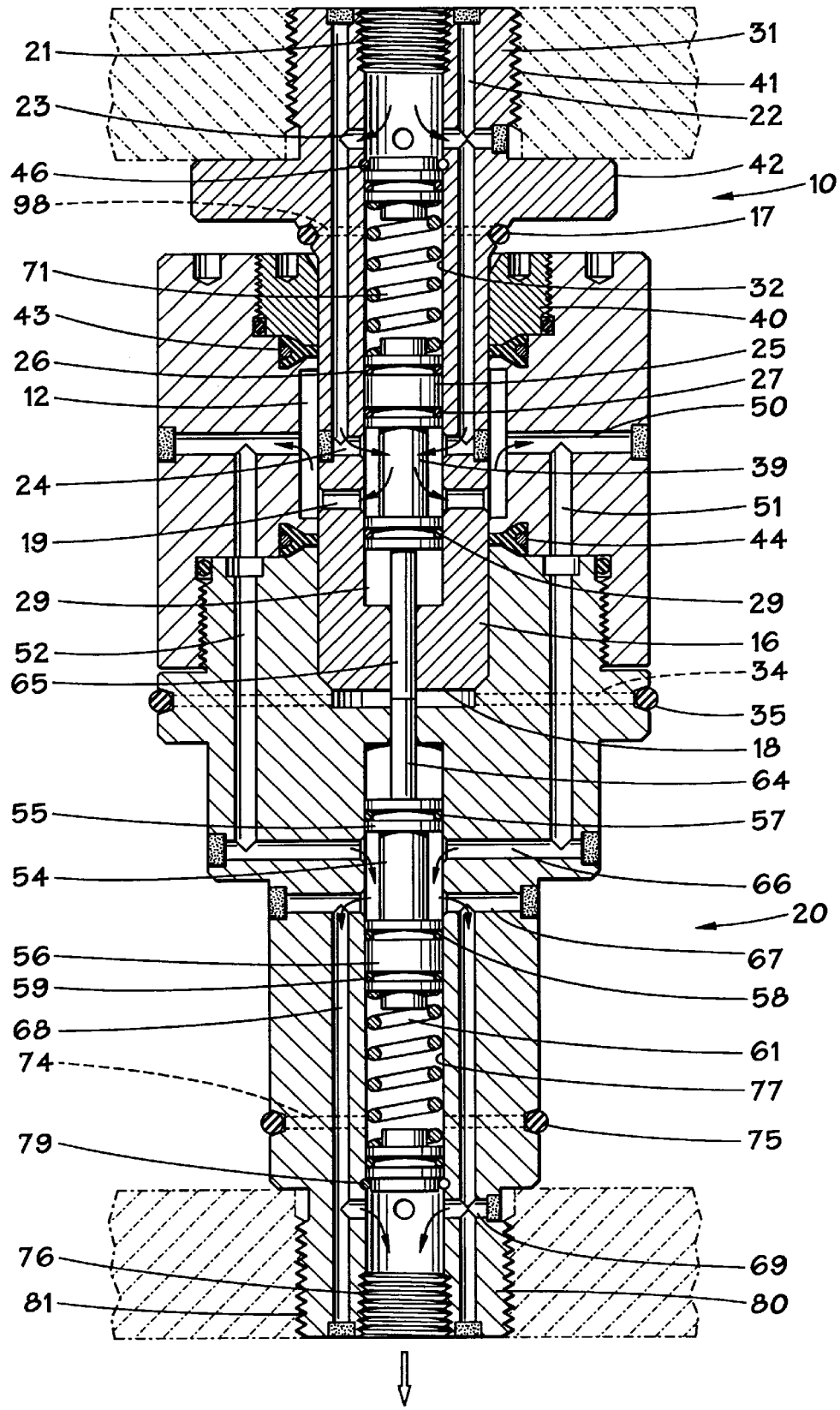
FIG. 2 is a sectional view of the male member fully inserted into the female member of the coupling according to a first embodiment.

In FIG. 1 and FIG. 2, a first embodiment of the coupling of the present invention is shown. The coupling comprises male member 10, and a female member with a split body having first part 20 and second part 30 engaged to the first part. Preferably, the second part of the split body is engaged to the first part with threads 14. When male member 10 is inserted through central bore 38 of first part 20 and second part 30 of the female member split body, radial fluid passages permit fluid communication between the male member and female member. The fluid communication is established without significant pressure exerted against the face of the male member during or after insertion. The fluid communication between the male and female members is established through radial passage 19 in the outside longitudinal surface of the male member and a corresponding radial fluid passage 50 in the second part of the female member split body.

In FIG. 1 and FIG. 2, male member 10 includes handle 31, flange 42, and probe body 16. The handle may be threaded at 41 to manifold plate 11. The male member and female member are typically connected to opposing plates of a manifold and are held together by bolts or hydraulic members attached to the plates of manifolds. The male member is commonly attached to one plate 11, while the female member is attached to an opposing plate 21 so as to face the male member and align with it. Handle 80 of the female member may be threaded at 81 to plate 21. Handle 80 also may be internally threaded at 76 to provide connection to hydraulic lines. The male and female members may be attached to manifold plates using various means, such as set screws or threads. Techniques for attaching the members to such manifold plates are well known to those skilled in the art.

The probe body has a cylindrical probe wall 45 adapted for sliding engagement in receiving chamber 38 of the female member of the coupling. The probe body of the male member terminates at probe face 18. The male member has a central bore 32 having several variations in its diameter as it extends therethrough. In a preferred embodiment, the first end of central bore 32 is an internally threaded section 21 for connection to a hydraulic line.

Optionally, a valve assembly may be included in the central bore of the male member or the female member, or in both coupling members. The valves are slidable between an open and closed position. Valve actuator 65 is used to urge the male member valve open, when the valve actuator contacts the corresponding valve actuator 64 of the female member. Each of the valves are biased into the closed position by spring 71 in the male member and spring 61 in the female member. The valve springs are anchored with clip 46 held in a groove in the central bore of the male member and clip 79 in the female member bore.

When the valve of the male member is in the closed position, hydraulic fluid transmission is blocked through the male member of the coupling. Fluid may be transmitted by opening the valve so that radial passage 19 communicates between the outer circumference of the male member and central bore 32 of the male member. No additional longitudinal passages are included in the male member. Preferably, a pair of radial fluid passages 19 are positioned between the central bore 32 of the male member and the cylindrical probe wall 45. Valves that may be used in the male and female coupling members of the present invention include, but are not limited to, poppet valves shown and described in any of U.S. Pat. Nos. 5,277,225, 5,203,374, 5099,882, 4,832,080 and 4,754,780 to Robert E. Smith, III, which are incorporated by reference.

Figure 3:
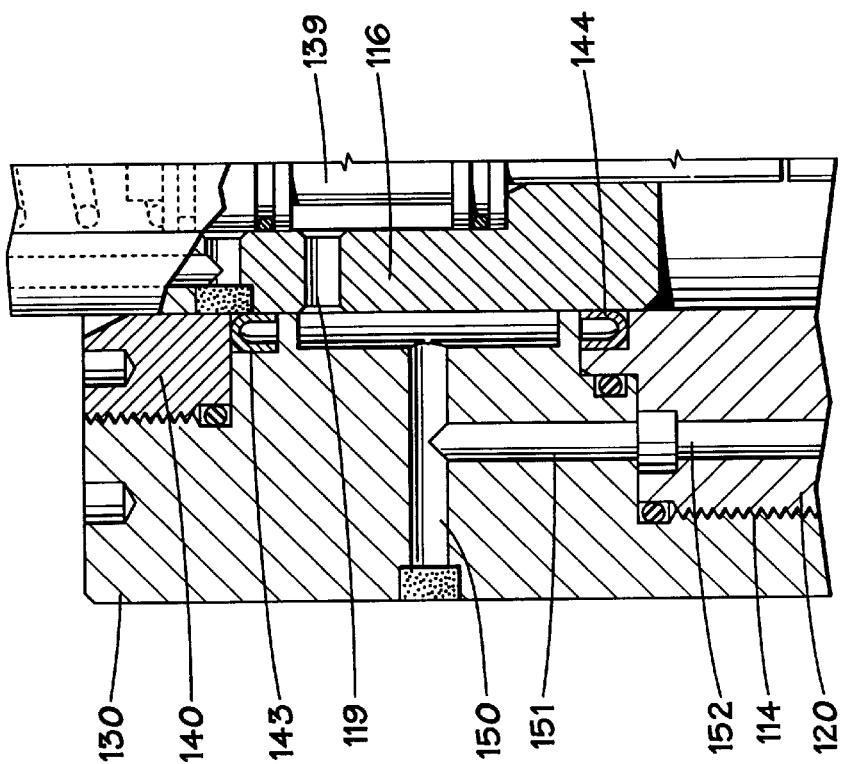
FIG. 3 is an expanded sectional view of a portion of the male member partially inserted into the female member according to the first embodiment.

Also, and as shown and described in the embodiment of FIGS. 1, 2 and 3, the valves in both coupling members optionally may be pressure balanced poppet valves as shown and described in U.S. Pat. No. 5,360,035 which also is incorporated by reference. In the embodiment having a pressure balanced poppet valve in the male member, one or more longitudinal fluid passages 22 are added to the male member, parallel to the central bore of the male member. The longitudinal passages transmit hydraulic fluid between radial passage 24 and radial passage 23 in the body of the male member. The pressure balanced poppet valve in the male member includes flange 28 which abuts shoulder 84 in central bore 32. O-ring 29 seals between flange 28 of the valve and the central bore. The valve also includes a valve spacer 39 which has a diameter smaller than that of the male member central bore. The valve spacer 39 is connected to valve flange 25, sealed with bore 32 by O-rings 26 and 27.

The female member of the coupling has a split body with first part 20 and second part 30. The second part is preferably engaged to the first part with threads 14. Radial seal 44 is positioned on the shoulder surface between the first part and second part of the split body. In the first embodiment shown in FIGS. 1, 2 and 3, the radial seal is a dovetail shaped elastometric seal. To remove and/or replace the radial seal, the second part of the female member is disconnected and removed from the first part. The radial seal may instead be a metal seal, as will be described below with reference to FIG. 4.

Central bore 77 extends through the first part and second part of the split body. At least a portion of the central bore is receiving chamber 38 dimensioned for sliding insertion of the male member therethrough. When the male member is inserted into receiving chamber 38, annular space 12 may be formed between a portion of the male member and the receiving chamber adjacent radial passages 19 and 50. Fluid communication between the male member and the female member is established radially between the coupling members, through radial passages 19 and 50.

Optionally, a valve assembly is positioned in the central bore of the female member and is slidable between an open and a closed position. When the valve is closed, fluid communication is blocked between the longitudinal passages in the first part and second part of the female member split body. Closure of the female member valve also prevents fluid communication between radial passage 66 and central bore 77 of the female member. When the male member is inserted into receiving chamber 38, valve actuator 64 of the female member valve contacts valve actuator 65 of the male member valve to urge open the valves of each of the coupling members. In the female member of the present invention, the poppet valve assembly shown in one or more of U.S. Pat. Nos. 5,277,225, 5,203,374, 5,099,882, 4,832,080 and 4,754,780 to Robert E. Smith, III may be used. In that embodiment, fluid flow in the female member split body is through central bore 77, longitudinal passage 52, longitudinal passage 51, and radial passage 50.

Optionally, as shown in FIGS. 1, 2 and 3, the poppet valve in the female member of the coupling may be pressure balanced. In that embodiment, longitudinal passage 68, parallel to central bore 77, is added to provide fluid communication between radial passages 67 and 69 in the first part of the female member. The pressure balanced poppet valve assembly includes flange 55 and O-ring 57 sealing between the flange and central bore 77. Valve spacer 54 has a diameter substantially smaller than the diameter of central bore 77. Flange 56 is sealed to the central bore with O-rings 58 and 59.

Second part 30 of the split body includes longitudinal passage 51 which, when the second part is connected to the first part, communicates with longitudinal passage 52. Longitudinal passage 51 is connected to radial fluid passage 50. Accordingly, when the second part of the female member is connected to the first part of the split body, fluid is transmitted between central bore 77, radial passage 66, and longitudinal passage 52 in the first part of the split body, and through longitudinal passage 51 and radial passage 50 in the second part of the split body.

A second radial seal also may be positioned on a shoulder in the second part of the female member split body, if desired. Preferably, the second radial seal is an elastometric seal 43 having a dovetail interfit between the second part of the split body and seal retaining member 40. Seal retaining member 40 may be threaded to the second part of the female split body, and has a central bore dimensioned to allow insertion of the probe therethrough.

Now referring to FIG. 2, male member 10 of the hydraulic coupling is shown fully inserted into the female member of the coupling. In the embodiment of FIG. 2, when the male member is fully inserted into the female member, valve actuator 65 urges the male member valve into an open position, while valve actuator 64 urges the corresponding female member valve open. This permits fluid communication between radial passage 50 in the second part of the female member, through annular space 12, and radial passage 19 in the male member of the coupling. Radial seal 44 and radial seal 43 are preferably on opposing sides of the annular space 12 when the male member is fully inserted into the receiving chamber of the female member.

Optionally, bleed passage 98 may be used between the central bore 32 and the probe wall 45 of the male member, where it is sealed with O-ring 17. Additionally, bleed passage 34 may be used between the receiving chamber 38 and outer circumference of the first part of the female member to allow expulsion of sea water from the receiving chamber. For example, sea water may be expelled from the receiving chamber by the leading face 18 of the male member. The bleed passage 34 may be sealed with O-ring 35. Additionally, bleed passage 74 may be included in the first part of the female member to allow expulsion of sea water from central bore 77. This bleed passage may be sealed with O-ring 75.

Now referring to FIG. 3 of the drawing, an expanded cross section of the male member partially inserted into the female member receiving chamber is shown. Radial seal 44 is shown at the junction between the first part 20 and second part 30 of the female member. When the second part is connected to the first part of the split body, longitudinal passage 52 of the first part and longitudinal passage 51 in the second part of the female member are interconnected allowing transmission of hydraulic fluid therebetween.

Figure 4:
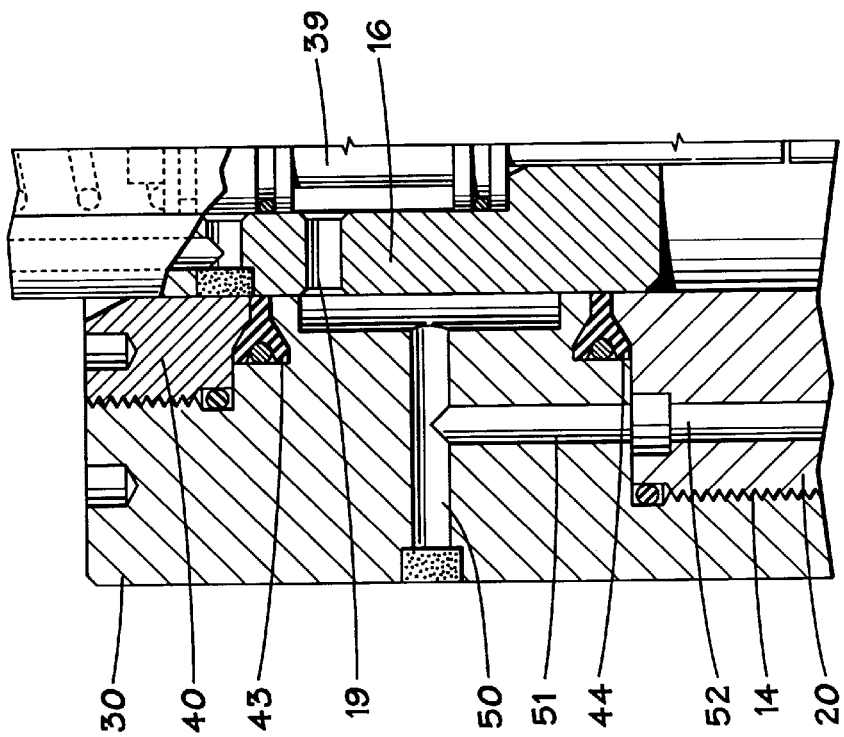
FIG. 4 is an expanded sectional view of a portion of the male member and female member according to a second embodiment of the present invention.

Now referring to FIG. 4 of the drawing, in a second preferred embodiment, a pressure energized metal seal 144 is used between the first part 120 of the female member split body and the second part 130. When the second part 130 is threaded at 114 to the first part of the female member, fluid communication may be established between the split body through longitudinal passages 151 and 152. The male member body 116 has a radial passage 119 between its central bore and the outer surface. Valve spacer 139 provides an annulus inside the central bore the male member. When the male member is fully inserted into the receiving chamber of the female member, hydraulic fluid may be transmitted between radial passage 150 in the second part of the female member and radial passage 119 in the male member. Additionally, a second radial metal seal 143 may be included on a shoulder surface in the second part of the split body, and held in place with retainer 140. Retainer 140 may be connected to the second part of the female member with threads or other means as will be apparent to those skilled in the art.

Although in a preferred embodiment a pair of radial passages are shown in the first part of the female member, the second part of the female member, and in the male member, the present invention contemplates that one or more radial passages may be used in each of the components of the coupling assembly. Accordingly, fluid transmission between the coupling members is facilitated by radial transmission of hydraulic fluid without exerting significant pressure against the leading face 18 of the male member or against the receiving chamber in the female member. Also, it is contemplated that the present invention may be used in a coupling with or without valves in the male and/or female coupling members.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling comprising:
   (a) a male member having an outer surface, a central bore, and a radial passage providing fluid communication between the central bore and the outer surface;
   (b) a female member having a split body with a first part and a second part removably engaged to the first part; a central bore extending through the first part and second part of the body, at least a portion of the central bore having a receiving chamber dimensioned to receive the male member therethrough, the first part and second part of the body each having radial passages extending outwardly from the central bore, the first part and second part of the body each having longitudinal passages parallel to the central bore interconnected to the radial passages, the longitudinal passages providing fluid communication between the first part and the second part of the split body; and
   (c) a radial seal positioned between the first part and second part of the split body, the radial seal dimensioned to seal radially with the outer surface of the male member and the central bore of the female member.

2. The undersea hydraulic coupling of claim 1 wherein the radial seal is an elastomeric seal having a dovetail interfit between the first part and second part.

3. The undersea hydraulic coupling of claim 1 further comprising a seal retainer removably engaged to the second part of the split body, and a second radial seal between the seal retainer and second part of the split body, the second radial seal dimensioned to seal radially with the outer surface of the male member and the central bore of the female member.

4. The undersea hydraulic coupling of claim 1 wherein at least one of the male and female coupling members includes a normally closed poppet valve.

5. An undersea hydraulic coupling, comprising:
   (a) a male member having a first end, a second end, an outer circumference, a central bore, and a first fluid passage communicating between the central bore and the outer circumference adjacent the second end of the male member;
   (b) a first female member part having a first end, a second end, a central bore, a second fluid passage parallel to the central bore adjacent the first end of the first female member, and a third fluid passage communicating between the central bore and the second fluid passage;
   (c) a second female member part engaged to the first end of the first female member part and having a central bore, a fourth fluid passage parallel to the central bore, the fourth fluid passage communicating with the second fluid passage, and a fifth fluid passage communicating between the fourth fluid passage and the first fluid passage when the male member is engaged to the first and second female members.

6. The undersea hydraulic coupling of claim 5 further comprising a first radial seal interposed between the first and second female member parts, the first radial seal engaging the outer circumference of the male member when the male member is engaged to the first and second female member parts.

7. The undersea hydraulic coupling of claim 6 further comprising a second radial seal held in place by the second female member part, the second radial seal engaging the outer circumference of the male member when the male member is engaged to the first and second female member parts.

8. The undersea hydraulic coupling of claim 6 wherein the radial seal has a dovetail interfit with the second female member part.

9. The undersea hydraulic coupling of claim 5 wherein the second female member part is threaded to the first female member part.

10. The undersea hydraulic coupling of claim 7 further comprising a retainer engaged to the second female member part for retaining the second radial seal.

11. An undersea hydraulic coupling, comprising:
    (a) a male member having a longitudinal fluid passage connected to a radial fluid passage;
    (b) a female member having a split body with a first part and a second part removably engaged to the first part, a central bore dimensioned to receive the male member, the first part and second part each having a longitudinal fluid passage connected to a radial fluid passage, the longitudinal fluid passages of the first and second parts being interconnected when the second part is engaged to the first part, each of the radial fluid passages extending between the longitudinal fluid passages and the central bore; and
    (c) at least one radial seal positioned between the first part and second part of the female member, the radial seal removable by separating the first part and second part of the female member.

12. The undersea hydraulic coupling of claim 11 further comprising first and second valves in the male and female members respectively, the valves having actuators extending therefrom, the valve actuators mutually engageable when the male member is in the central bore of the female member to open the first and second valves.

13. The undersea hydraulic coupling of claim 11 wherein the female member is configured to restrain movement of the radial seal into the central bore.

14. The undersea hydraulic coupling of claim 11 further comprising a second radial seal positioned in the central bore of the female member, the female member being configured to restrain movement of the second radial seal into the central bore.

15. The undersea hydraulic coupling of claim 14 further comprising a seal retaining member threaded to the female member for retaining the second radial seal.

16. The undersea hydraulic coupling of claim 15 wherein the second radial seal is an elastometric seal having a dovetail interfit between the seal retaining member and the female member.

17. The undersea hydraulic coupling of claim 11 wherein the second part of the female member is threaded to the first part.

18. The undersea hydraulic coupling of claim 11 wherein the radial seal is an elastometric seal having a dovetail interfit between the first and second parts of the female member.

19. The undersea hydraulic coupling of claim 11 wherein the radial seal is a pressure-energized metal seal positioned in the central bore of the female member.

20. The undersea hydraulic coupling of claim 19 further comprising a second radial pressure-energized metal seal positioned in the central bore of the female member.

* * * * *